United States Patent
Strashny et al.

(10) Patent No.: US 11,894,631 B2
(45) Date of Patent: Feb. 6, 2024

(54) CONCENTRIC CONDUCTOR

(71) Applicant: Caterpillar Inc., Peoria, IL (US)

(72) Inventors: Igor Strashny, Tucson, AZ (US);
Andrew Hamilla, Tucson, AZ (US)

(73) Assignee: Caterpillar Inc., Peoria, IL (US)

( * ) Notice: Subject to any disclaimer, the term of this patent is extended or adjusted under 35 U.S.C. 154(b) by 254 days.

(21) Appl. No.: 17/535,075

(22) Filed: Nov. 24, 2021

(65) Prior Publication Data

US 2023/0163506 A1 May 25, 2023

(51) Int. Cl.
*H01R 13/24* (2006.01)
*H01R 13/03* (2006.01)
*B60K 1/04* (2019.01)
*H01R 101/00* (2006.01)
*B60L 50/60* (2019.01)

(52) U.S. Cl.
CPC ......... *H01R 13/2478* (2013.01); *H01R 13/03* (2013.01); *B60K 1/04* (2013.01); *B60L 50/60* (2019.02); *B60L 2200/40* (2013.01); *H01R 2101/00* (2013.01); *H01R 2201/26* (2013.01)

(58) Field of Classification Search
CPC .............. H01R 13/2478; H01R 13/03; H01R 2101/00; H01R 2201/26; B60L 50/60; B60L 2200/04; B60L 2200/40; B60K 1/04
USPC .......................................................... 439/34
See application file for complete search history.

(56) References Cited

U.S. PATENT DOCUMENTS

| | | | |
|---|---|---|---|
| 3,622,683 A * | 11/1971 | Roberts | H01B 11/04 174/105 R |
| 4,642,417 A | 2/1987 | Ruthrof et al. | |
| 5,122,622 A | 6/1992 | Reuss et al. | |
| 6,750,399 B1 | 6/2004 | Daumling | |
| 8,872,026 B2 | 10/2014 | Guyader et al. | |
| 8,925,405 B2 | 1/2015 | Kawabuchi et al. | |
| 8,978,852 B2 | 3/2015 | Andre et al. | |
| 9,870,845 B2 | 1/2018 | Nagahashi | |
| 10,053,096 B2 | 8/2018 | Schunk et al. | |
| 10,137,785 B2 | 11/2018 | Vahle et al. | |
| 10,232,719 B2 | 3/2019 | Tajima | |
| 2007/0251204 A1 | 11/2007 | Susai et al. | |
| 2010/0029115 A1 | 2/2010 | Coldren et al. | |
| 2011/0132653 A1* | 6/2011 | Montena | H01B 11/1826 174/350 |
| 2014/0345904 A1 | 11/2014 | Nagahashi | |
| 2017/0106767 A1 | 4/2017 | Tajima et al. | |
| 2017/0210238 A1 | 7/2017 | Buehs et al. | |

FOREIGN PATENT DOCUMENTS

| | | |
|---|---|---|
| CN | 201516809 U | 6/2010 |
| CN | 101947920 A | 1/2011 |
| CN | 204452108 U | 7/2015 |

(Continued)

OTHER PUBLICATIONS

Written Opinion and International Search Report for Int'l. Patent Appln. No. PCT/US2022/080286, dated Apr. 7, 2023 (9 pgs).

*Primary Examiner* — Peter G Leigh

(57) ABSTRACT

The present disclosure provides a concentric conductor for conducting electrical power from a source to a receiving system or load. The concentric conductor includes one or more conducting tubes interior to an outer tube, extending concentrically around a central axis. The conducting tubes are affixed a head-end interface and a connector assembly at either end of the concentric conductors.

20 Claims, 8 Drawing Sheets

(56) References Cited

FOREIGN PATENT DOCUMENTS

| | | | |
|---|---|---|---|
| CN | 107215238 A | 9/2017 | |
| CN | 211543283 U | 9/2020 | |
| EP | 2284635 A | 2/2011 | |
| EP | 2920854 B1 * | 11/2016 | ............. A61B 90/50 |
| JP | 2019160668 A | 9/2019 | |
| JP | 6691672 B2 | 5/2020 | |
| WO | WO-9521450 A1 * | 8/1995 | ......... H01B 11/1091 |
| WO | WO2009007879 A2 | 1/2009 | |
| WO | WO2020186296 A1 | 9/2020 | |

* cited by examiner

CONCENTRIC CONDUCTOR

TECHNICAL FIELD

The present disclosure relates to a system used to provide electrical power to an electrically powered load or work machine. More specifically, the present disclosure relates to a conductive rod having concentric cylinder conductors concentrically aligned that provide for an electrically powered work machine to maintain an electrical and/or physical connection with a roadside power source.

BACKGROUND

Heavy work machines, such as earth-moving vehicles or hauling trucks, require significant power to carry out their functions. The machines themselves can be of substantial weight, and their loads require large amounts of power to move. Diesel engines typically provide that power, but they can have disadvantages. For instance, in some implementations, heavy work machines may need to travel large distances through rugged terrain. At a remote mining site, for example, groups of these machines are often employed to ferry extreme loads along roadways, or haul routes, extending between various locations within the mining site. Supplies of diesel fuel may be far away from such locations or not easily delivered to such locations. In addition, the groups of diesel machines can generate significant pollution.

Electrical power has been used to supplement these diesel engines while the work machines move. In some environments, the electrical power is delivered from wires over the haul route to a pantograph on the work machine as the machine travels the haul route, as in a cable car. But overhead wires cannot reliably provide sufficient electrical energy to power a heavy work machine during long movements. Nor can the overhead delivery provide enough current to charge backup batteries for an electric machine at the same time. As a result, electrical power provided through overhead wires typically supplements, rather than replaces, power generated by diesel engines in heavy work machines.

It is not uncommon for overhead wires to use a coaxial cable configuration. In conventional construction, a coaxial cable typically has a flexible core having an inner conductor, typically copper. The core is often shielded by a metallic sheath that surrounds the core and can serve as an outer conductor in some examples. The coaxial cable further often includes one or more layers of insulation, typically between the core and the metal sheath, as well as, around the outside of the cable itself. The insulation between the core and the metal sheath can act as a dielectric that surrounds the inner conductor and electrically insulates it from the surrounding metallic sheath. In many known coaxial cable constructions, an expanded foam dielectric surrounds the inner conductor and fills the space between the inner conductor and the surrounding metallic sheath. An example of a coaxial cable can be found in U.S. Patent Publication No. 2014/0345904 to Nagahashi (the '904 application). The '904 application describes the use of an inner bundle of single wires and an outer bundle of single wires to create a coaxial cable. The inner wires are centrally positioning in the coaxial cable and extends along a length of the center of coaxial cable. A dielectric material surrounds and encapsulates the inner bundle of wires along the length of the coaxial cable. The outer bundle of wires, sometimes used as a sheath, surrounds the dielectric material and extends the length of the coaxial cable coaxially to the inner wires and the dielectric material.

However, the use of flexible (or deformable) coaxial cables can be problematic. In some examples, support for the conductor is essentially limited to the one end of the conductor at a load and the other end of the conductor at the power source. The flexible cable between the two supports is unsupported. While coaxial cables, such as the coaxial cable of '904 application, are typically designed to be flexible, as they are often used in systems and environments in which it is necessary to manipulate the shape of the cable, this flexibility can cause the cable to continually deform during use under its own weight. Further, the flexible cable can move or sway as if the load moves. These and other dynamic forces applied to the flexible cable can only degrade the performance of the cable but may also cause safety issues with the movement of the flexible cable.

Examples of the present disclosure are directed to overcoming deficiencies of such systems.

SUMMARY

In an aspect of the presently disclosed subject matter, a conductor rod includes a first cylinder conductor extending along a longitudinal axis of the conductor rod, the first cylinder conductor having a first inner diameter, a first outer diameter, a first terminal connector assembly affixed to the first cylinder conductor proximate a first end of the conductor rod, and a second terminal connector assembly affixed to the first cylinder conductor proximate a second end of the conductor rod. The conductor rod further includes a barrel extending along the longitudinal axis of the conductor rod, the barrel having a second inner diameter greater than the first outer diameter, a third terminal connector assembly affixed to the barrel proximate the first end of the conductor rod, and a fourth terminal connector assembly affixed to the barrel proximate the second end of the conductor rod. The conductor rod additionally includes a head-end interface, the first terminal connector assembly being affixed to the head-end interface affixing the first cylinder conductor to the head-end interface, and, the third terminal connector assembly being affixed to the head-end interface affixing the barrel to the head-end interface, and a connector assembly, the second terminal connector assembly being affixed to the connector assembly affixing the first cylinder conductor to the connector assembly, and, the fourth terminal connector assembly being affixed to the connector assembly affixing the barrel to the connector assembly.

In another aspect of the presently disclosed subject matter, a work machine includes an electric engine, a conductor rod for providing electrical energy to the electric engine from a power source, the conductor rod extending along a longitudinal axis of the conductor rod, from a head-end interface proximate to the work machine to a connector assembly spaced laterally from the work machine. The conductor rod includes a first cylinder conductor extending along the longitudinal axis of the conductor rod having a first inner diameter and a first outer diameter, the first cylinder conductor comprising a first terminal connector assembly affixed to the head-end interface and a second terminal connector assembly affixed to the connector assembly, a second cylinder conductor extending along the longitudinal axis of the conductor rod having a second inner diameter greater than the first outer diameter of the first cylinder conductor and a second outer diameter, the second cylinder conductor comprising a third terminal connector assembly affixed to the head-end interface and a fourth terminal connector assembly affixed to the connector assembly, a barrel extending along the longitudinal axis of the conductor rod having a third inner diameter greater than the second outer diameter of the second cylinder conductor and a third outer diameter, the barrel comprising a fifth terminal connector assembly affixed to the head-end interface and a sixth terminal connector assembly affixed to the connector assembly, and wherein the first cylinder conductor or the second cylinder conductor comprise an electrically conductive material to conduct electrical power from a power source to the electric engine of the work machine.

In a still further aspect of the presently disclosed subject matter, a method of assembling a conductor rod for use on a work machine includes affixing a first cylinder conductor to a head-end interface by threading a first set of threaded members through the head-end interface into a first terminal connector assembly affixed to the first cylinder conductor, the first cylinder conductor having a first outer diameter, affixing a second cylinder conductor to the head-end interface by threading a second set of threaded members through the head-end interface into a second set of terminal connector assemblies affixed to the second cylinder conductor, wherein the second cylinder conductor has a second inner diameter and a second outer diameter, wherein the second inner diameter is greater than the first outer diameter of the first cylinder conductor defining a first cavity, affixing a barrel to the head-end interface by threading a third set of threaded members through the head-end interface into a third set of terminal connector assemblies affixed to the barrel, wherein the barrel has a third inner diameter and third outer diameter, wherein the third inner diameter is greater than the second outer diameter of the second cylinder conductor defining a second cavity, affixing the first cylinder conductor to connector assembly by threading a fourth set of threaded members through the connector assembly into a fourth terminal connector assembly affixed to the first cylinder conductor, affixing the second cylinder conductor to the connector assembly by threading a fifth set of threaded members through the connector assembly into a fifth set of terminal connector assemblies affixed to the second cylinder conductor, and affixing the barrel to the connector assembly by threading a sixth set of threaded members through the connector assembly into a sixth set of terminal connector assemblies affixed to the barrel.

DETAILED DESCRIPTION

Figure 1:
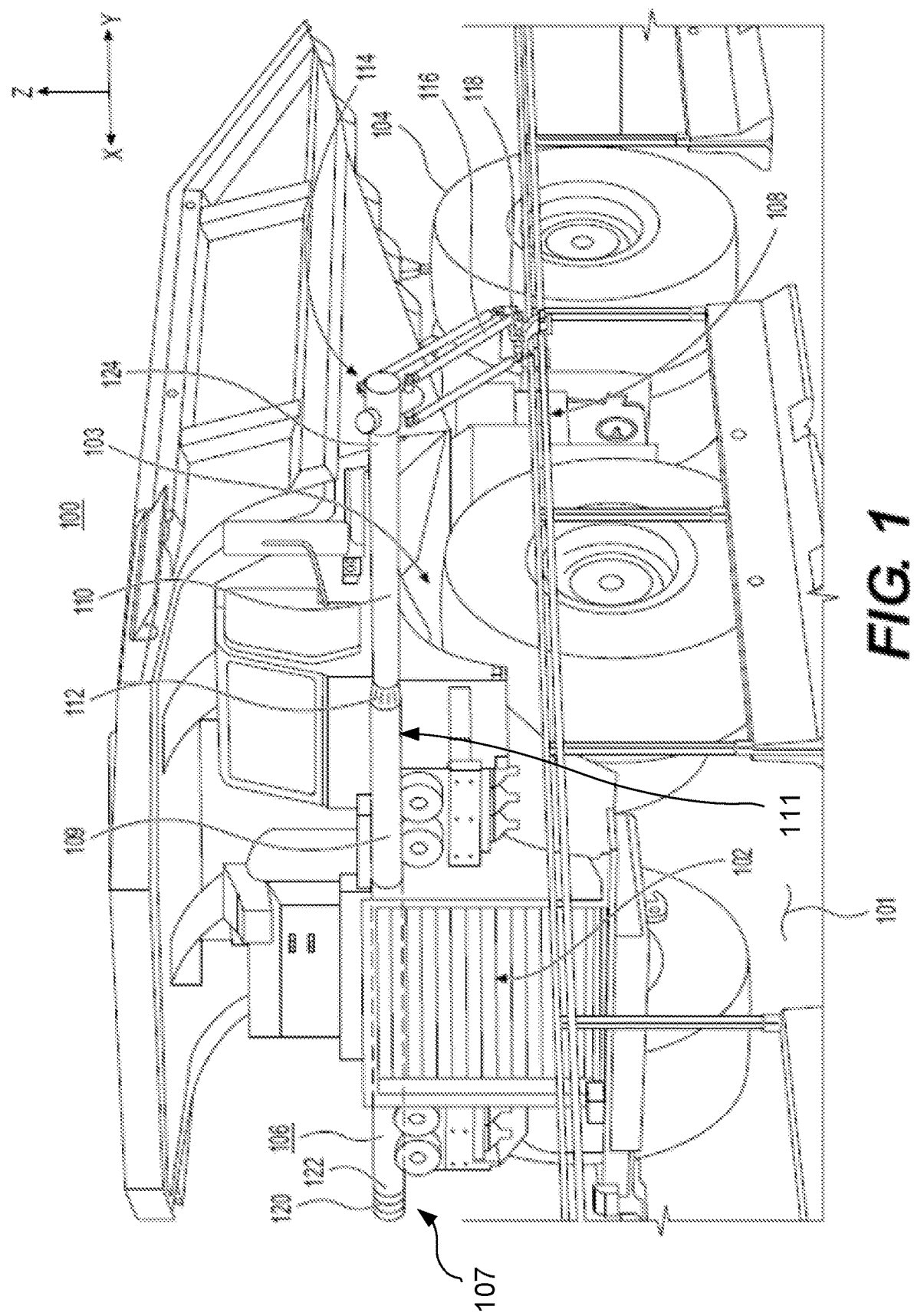
FIG. 1 illustrates an isometric view of a work machine within an XYZ coordinate system as one example suitable for carrying out the principles discussed in the present disclosure.

Wherever possible, the same reference numbers will be used throughout the drawings to refer to same or like parts. FIG. 1 illustrates an isometric view of a work machine 100 within an XYZ coordinate system as one example suitable for carrying out the principles discussed in the present disclosure. The exemplary work machine 100 travels parallel to the X axis along a roadway, also termed a haul route 101, typically from a source to a destination within a worksite. In one implementation as illustrated, work machine 100 is a hauling machine that hauls a load within or from a worksite within a mining operation. For instance, the work machine 100 may haul excavated ore or other earthen materials from an excavation area along haul route 101 to dump sites and then return to the excavation area. In this arrangement, work machine 100 may be one of many similar machines configured to ferry earthen material in a trolley arrangement. While a large mining truck in this instance, work machine 100 may be any machine that carries a load between different locations within a worksite, examples of which include an articulated truck, an off-highway truck, an on-highway dump truck, a wheel tractor scraper, or any other similar machine. Alternatively, work machine 100 may be an off-highway truck, on-highway truck, a dump truck, an articulated truck, a loader, an excavator, a pipe layer, or a motor grader. In other implementations, work machine 100 need not haul a load and may be any machine associated with various industrial applications including, but not limited to, mining, agriculture, forestry, construction, and other industrial applications.

Referring to FIG. 1, an example work machine 100 includes a frame 103 powered by electric engine 102 to cause rotation of traction devices 104. Traction devices 104 are typically four or more wheels with tires, although tracks or other mechanisms for engagement with the ground along haul route 101 are possible. Electric engine 102 functions to provide mechanical energy to work machine 100 based on an external electrical power source, such as described in further detail below. An example of mechanical energy provided by electric engine 102 includes propelling traction devices 104 to cause movement of work machine 100 along haul route 101, but electric engine 102 also includes components sufficient to power other affiliated operations within work machine 100. For instance, in some implementations, electric engine 102 includes equipment for converting electrical energy to provide pneumatic or hydraulic actions within work machine 100. While electric engine 102 is configured to operate from an external electrical power source, electric engine 102 typically includes one or more batteries for storing electrical energy for auxiliary or backup operations.

In accordance with the principles of the present disclosure, and relevant to the presently disclosed subject matter, the work machine 100 further includes a conductor rod 106 configured to receive electrical power from a power rail 108. In some examples, power rail 108 is one or more beams of metal arranged substantially parallel to and a distance above the ground. In FIG. 1, power rail 108 is positioned to be substantially parallel to the X axis and the direction of travel of work machine 100. Support mechanisms hold power rail 108 in place along a distance at the side of haul route 101 for work machine 100 to traverse. The support mechanisms and power rail 108 may be modular in construction, enabling their disassembly and reassembly at different locations or their repositioning along the existing haul route 101. Moreover, while shown in FIG. 1 to the left of work machine 100 from the perspective of an operator sitting in the cab of the work machine 100, power rail 108 may be disposed to the right of work machine 100 or in other locations suitable to the particular implementation.

Power rail 108 provides a source of electrical power for work machine 100 as either AC or DC. In some examples, power rail 108 has two or more conductors, each providing voltage and current at a different electrical pole. In one implementation (e.g., an implementation in which the power rail 108 includes three conductors), one conductor provides positive DC voltage, a second conductor provides negative DC voltage, and a third conductor provides 0 volts relative to the other two conductors. The two powered conductors within power rail 108 provide +1500 VDC and −1500 VDC. These values are exemplary, and other physical and electrical configurations for power rail 108 are available and within the knowledge of those of ordinary skill in the art Further, it should be understood that the voltages described herein are merely exemplary, as various levels of AC voltage may be used, as well as a combination of AC and DC voltages, depending on the particular configuration.

Conductor rod 106 enables electrical connection between work machine 100 and power rail 108, including during movement of work machine 100 along haul route 101. In the example shown in FIG. 1, conductor rod 106 is an elongated arm resembling a pole. FIG. 1 shows conductor rod 106 positioned along a front side of work machine 100, with respect to the direction of travel of work machine 100 in the direction of the X axis. In this arrangement, conductor rod 106 is located in FIG. 1 in the Y-Z plane essentially along the Y axis with a first end 107 near a right side of work machine 100 and a second end 111 at a left side of work machine 100. Conductor rod 106 may be attached to any convenient location within work machine 100, such as to frame 103, in a manner to couple conductor rod 106 to power rail 108. Shown in FIG. 1 as extending to a left side of work machine 100 toward power rail 108, conductor rod 106 may alternatively be arranged to extend to a right side and at any desired angle from work machine 100 such that conductor rod 106 may be coupled to power rail 108 for obtaining electrical power.

As embodied in FIG. 1, conductor rod 106 includes a barrel 109 mounted to frame 103 of work machine 100. Barrel 109 has a hollow interior and may be a conductive metal having suitable mechanical strength and resiliency, such as aluminum. Within barrel 109, an arm 110 is retained. Arm 110 is engaged within conductor rod 106 along the Y axis in FIG. 1. A length of conductor rod 106 roughly spans the width of work machine 100. A junction 112 serves as the junction or interface between arm 110 and barrel 109, which is the main body of conductor rod 106. When arm 110 is fully retracted or collapsed into barrel 109, junction 112 essentially becomes the left edge of conductor rod 106. On the other hand, when arm 110 is extended from barrel 109 of conductor rod 106, arm 110 may reach from work machine 100 to proximate power rail 108 on the side of haul route 101.

Within, and possibly including barrel 109, conductor rod 106 includes a series of electrical conductors passing longitudinally, at least from a head 122 at a proximal end of the conductor rod 106 to a tip 124 at a distal end of the conductor rod 106. Typically, the conductors within conductor rod 106 are formed of a metallic material and are rigid. In some examples, the conductors are concentric tubes, or hollow cylinders, of solid metal such as copper, aluminum, gold, silver, nickel, zinc, or alloys thereof nested together and sized to provide electrical capacity sufficient for powering work machine 100. Other conductive materials may be used, such as graphite, and are considered to be within the scope of the presently disclosed subject matter. Tubular conductors within arm 110 engage with corresponding tubular conductors within barrel 109 to provide for electrical continuity. In other examples, one or more concentric copper tubes, rather than aluminum, of varying diameters may be used as tubular conductors. Other types of conductive tubes may be used and are within the scope of the presently disclosed subject matter.

At tip 124, a connector assembly 114 provides an interface to power rail 108 via trailing arms 116 and contactor 118. Power rail 108 is typically arranged along a side of haul route 101, and work machine 100 is steered so that it traverses haul route 101 substantially in parallel with power rail 108. Thus, in reference to FIG. 1, power rail 108 and a travel path for work machine 100 are substantially in parallel with each other and with the X axis. Contactor 118 is configured to maintain an electrical connection with power rail 108 while sliding along its surface in the direction of the X axis as work machine 100 moves. In some examples, trailing arms 116 are conductors coupled to contactor 118, each conducting voltage and current at a different electrical pole and corresponding to the conductors within conductor rod 106. In operation, electrical power is accessed from power rail 108 via contactor 118, which remain in contact during movement of work machine 100, and the electrical power is conducted through trailing arms 116 into connector assembly 114.

From connector assembly 114, the electrical power is conveyed at tip 124 through the nested tubular conductors within arm 110 and barrel 109 to head 122 of conductor rod 106 and through a head-end interface 120 to work machine 100. Head-end interface 120 provides at least an electrical connection between conductor rod 106 and work machine 100 for powering electric engine 102 and otherwise enabling operations within work machine 100. In some examples, head-end interface 120 may also provide an interface for inputs to control mechanical operation of conductor rod 106.

As noted above, the tubular or cylindrical nature of conductor rod 106, lending to a degree of rigidity greater than a solid conductor of similar or smaller mass or weight to conductor rod 106 due to a larger moment of inertia of a hollow tube than a solid rod of similar mass. Thus, by forming the conductive material into a hollow tube rather than a solid rod, for similar conductive performance, conductor rod 106 can provide a mechanism to conduct electrical power from a source to a load over an unsupported distance. As described above, trailing arms 116 are conductors coupled to contactor 118, each conducting voltage and current at a different electrical pole and corresponding to the conductors within conductor rod 106. Different cylindrical conductors within conductor rod 106 can provide for the transmission of different potentials along conductor rod 106, illustrated in more detail in FIG. 2, below.

Figure 2:
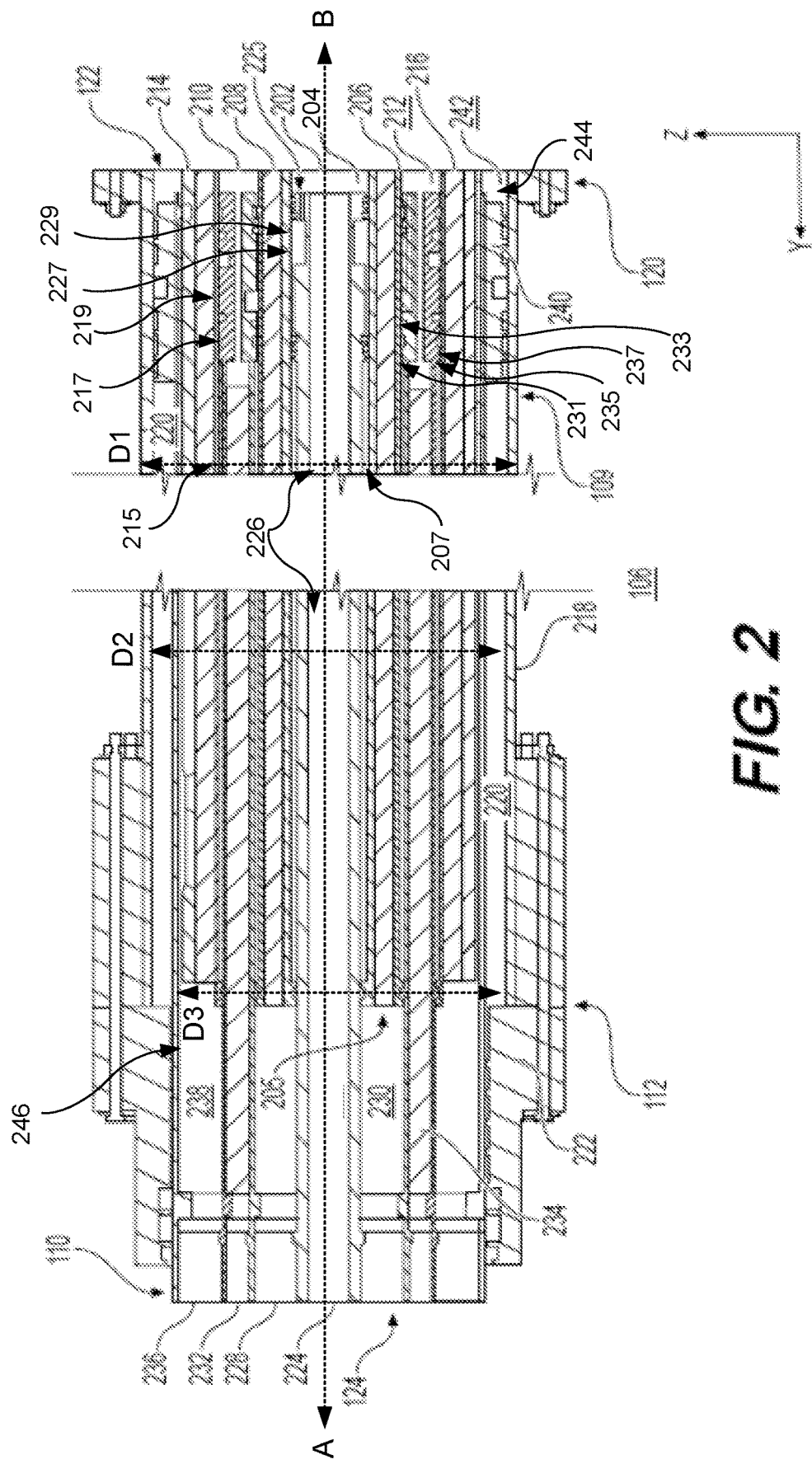
FIG. 2 illustrates a longitudinal section of a conductor rod with an arm disposed in a barrel, in accordance with one or more examples of the present disclosure.

FIG. 2 illustrates a longitudinal cross-section of a section of conductor rod 106 with arm 110 disposed in barrel 109, in accordance with one or more examples of the present disclosure. More specifically, FIG. 2 depicts a longitudinal cross-section of a section of conductor rod 106 between head-end interface 120 and connector assembly 114, from head 122 to tip 124, when viewed facing in the direction of travel for work machine 100, i.e., in the direction of the X axis along. Thus, conductor rod 106 lies in the Y-Z plane, as indicated in FIG. 2.

Referring to the right side of FIG. 2, barrel 109 contains an arrangement of concentric conductors of tubular shape, i.e., as hollow cylinders. In this example, from an axial center AB outward, first cylinder conductor 202 is positioned concentrically along axial center AB (i.e. the longitudinal axis of barrel 109) of barrel 109 and is a tubular conductor made of aluminum or a similar metal with high electrical conductivity and high mechanical strength. For instance, an aluminum alloy such as 6061-T6 may be used for first cylinder conductor 202 and other conductive tubes in conductor rod 106. Other suitable metals or alloys thereof may be used and are considered to be within the scope of the presently disclosed subject matter. In some examples, first cylinder conductor 202 has an outer diameter of approximately 3.5 inches to 4.5 inches. However, it should be understood that dimensions provided herein are merely for purposes of illustration and are not intended to be limitations, as dimensions described in relation to various components may be greater or less than the examples provided herein. First cylinder conductor 202 begins at head 122 and extends axially along conductor rod 106 around axial center AB to a barrel end 205. As a tube, first cylinder conductor 202 defines first cylinder cavity 204 within inner surface 207 of first cylinder conductor 202. If arm 110 were removed from barrel 109 in FIG. 2, first cylinder cavity 204 would be an open space within first cylinder conductor 202 from head 122 to barrel end 205. In one example, first cylinder cavity 204 has a diameter of about 2.5 to 3 inches.

A second cylinder conductor 206 is positioned concentrically along axial center AB and surrounds first cylinder conductor 202. As with first cylinder conductor 202, second cylinder conductor 206 is a tubular conductor made of aluminum or a similar metal with high electrical conductivity and high mechanical strength. Second cylinder conductor 206 is similarly positioned around a Y axis within FIG. 2 and spans a distance from head 122 to barrel end 205. In one example, second cylinder conductor 206 has an outer diameter of about 5 inches to 5.5 inches. These dimensions, as well as other dimensions discussed below, are merely examples and could be greater or lesser than the stated values. Being arranged concentrically around and, by definition, having a larger diameter than first cylinder conductor 202, second cylinder conductor 206 forms a radial gap between it and first cylinder conductor 202. In the example of FIG. 2, that gap is filled by second cylinder insulation 208, which is an insulation comprised of a closed cell polyurethane foam. Other types of materials for second cylinder insulation 208 that provide electrical insulation and lightweight support within conductor rod 106 will be available and apparent to those of ordinary skill in the field. In some examples, second cylinder insulation 208 has a thickness of about 1.5 inches to 0.75 inches.

In some examples, second cylinder insulation 208 can be a dielectric. Dielectric materials can be solids, liquids, or gases. Some solids can be used as dielectrics, such as porcelain, glass, plastics, and the closed cell polyurethane foam described above. In configurations in which a cylinder conductor or piston conductor is hermetically sealed on both ends of the cylinder conductor or piston conductor, fluidic dielectrics can be used in gaps, such as radial gap first cylinder conductor 202 and second cylinder conductor 206. Fluid dielectrics can include some forms of oil or gaseous dielectrics such as air, nitrogen, helium, and other dry gases such as sulfur hexafluoride. In further configurations in which a cylinder conductor or piston conductor is hermetically sealed on both ends of the cylinder conductor or piston conductor, a partial vacuum can be used. In various examples, a partial vacuum can be used as a nearly lossless dielectric even though its relative dielectric constant is unity. It should be noted that the dielectrics disclosed herein are merely examples, as other dielectrics may be used and are considered to be within the scope of the presently disclosed subject matter. Different dielectrics can be used in various radial gaps of conductor rod 106 to allow for different voltages and different types of potentials to be conducted by conductor rod 106. A partial vacuum can be created by pulling air from within a conductor rod, such as from within a cavity, explained in more detail in FIG. 7.

Moving farther out radially on the right side of FIG. 2, third cylinder conductor 210 is positioned concentrically along axial center AB and surrounds second cylinder conductor 206 and first cylinder conductor 202. Third cylinder conductor 210 is a tubular conductor made of aluminum or a similar metal with high electrical conductivity and high mechanical strength. As with the other tubes discussed, third cylinder conductor 210 extends from head 122 to barrel end 205 within conductor rod 106. In one example, third cylinder conductor 210 has an outer diameter of about 8 to 9 inches. A third cylinder cavity 212 between second cylinder conductor 206 and third cylinder conductor 210 is an open space, which, if arm 110 were removed from barrel 109 in FIG. 2, would form a tubular cavity extending from head 122 to barrel end 205.

Concentrically along axial center AB and around third cylinder conductor 210 and the other tubular conductors, fourth cylinder conductor 214 forms an outer conductive path from head 122 to barrel end 205. Similarly, fourth cylinder conductor 214 is a tubular conductor made of an aluminum alloy or a similar metal with high electrical conductivity and high mechanical strength. In one example, fourth cylinder conductor 214 has an outer diameter of about 14 inches. A gap 215 defined as a space between outer surface 217 of third cylinder conductor 210 and an inner surface 219 of fourth cylinder conductor 214, in some examples, is about 0.75 inches and is filled with fourth cylinder insulation 216, which is a closed cell polyurethane foam, dielectric, or similar substance.

Radially beyond fourth cylinder conductor 214, a covering or barrel shell 218 encases conductor rod 106. Barrel shell 218 is typically a metal or similar substance providing structural integrity to conductor rod 106. Barrel shell 218 has an inner diameter in excess of an outer diameter of fourth cylinder conductor 214. As a result, a retraction cavity 220 of a tubular shape is formed between fourth cylinder conductor 214 and barrel shell 218 that extends from head 122 to barrel end 205. A stop 222, which is part of a housing for conductor rod 106 at junction 112, defines a longitudinal end for retraction cavity 220 away from head 122.

The various annular or tubular cavities within barrel 109, namely, first cylinder cavity 204, third cylinder cavity 212, and the head end of retraction cavity 220 (barrel shell cavity 242, described below), are sealed or capped by the attachment of head-end interface 120 to their ends at head 122. The attachment of head-end interface 120 is designed to provide an airtight (or hermetic) seal within these cavities, for purposes to be understood further below.

Viewing FIGS. 1 and 2 together, arm 110 is a substantially cylindrical body having an outer diameter D1 that is smaller than inner diameter D2 of barrel shell 218, allowing arm 110 to slidable engage into barrel 109. As well as providing a longitudinal end for retraction cavity 220, stop 222 also defines an inner diameter D3 through which arm 110 slides, as shown to the left of FIG. 2. By sliding, it is meant that arm 110 may move longitudinally along the Y axis within barrel 109 as arm 110 is moved axially with respect to conductor rod 106, from left to right in FIG. 2 for retraction and from right to left in FIG. 2 for extension. The result of the sliding is the increase or decrease in the overall length of conductor rod 106 via arm 110, as illustrated in FIG. 1.

Referring now to the left side of FIG. 2, arm 110 also contains a series of concentric conductors of cylindrical or tubular shape. In this example, from the axial center outward, first piston conductor 224 is positioned at a center of arm 110 and is, as with the other tubular conductors of arm 110, made of a metal such as aluminum 6061-T6 or similar substance having high electrical conductivity and high mechanical strength. First piston conductor 224 extends from tip 124 to an arm end 225, shown at the right side of FIG. 2. Being tubular, first piston conductor 224 has a first piston cavity 226 within its inner diameter that is filled with air or another gas. A second piston conductor 228 concentrically surrounds first piston conductor 224 and extends from tip 124 to arm end 225. Second piston conductor 228 is made of a conductive material, and in some examples has an inner diameter of between about 5 and 6 inches. A space defined as second piston cavity 230 is formed between the inner diameter of second piston conductor 228 and the outer diameter of first piston conductor 224, which is left unfilled other than with air or a similar gas.

Moving radially outward from second piston conductor 228, a third piston conductor 232 axially centered on the Y axis concentrically surrounds second piston conductor 228. Similarly made of a conductive material, third piston conductor 232 is set off radially from second piston conductor 228 a distance of less than 1 inch, which is filled with a third piston insulation 234. As with second cylinder insulation 208 and fourth cylinder insulation 216, third piston insulation 234 can be a closed cell polyurethane foam or comparable substance providing electrical insulation and lightweight stability. An arm shell 236 of conductive material such as metal concentrically surrounds third piston conductor 232 from tip 124 to about arm end 225. In some examples, arm shell 236 has an outer diameter of about 11.625 inches. Within an inner diameter of arm shell 236, an arm shell cavity 238 of free space exists between arm shell 236 and third piston conductor 232.

In some examples, the outer surface of arm shell 236 includes gasket 240, which serves to stably set apart arm shell 236, and arm 110 generally, from barrel shell 218. As illustrated in FIG. 2, as arm 110 is retracted or extended within barrel 109, gasket 240 separates retraction cavity 220 from a barrel shell cavity 242. As well, gasket 240 can help retain arm 110 within conductor rod 106 in a state of maximum extension by butting against stop 222.

As illustrated, FIG. 2 represents an arrangement in which conductor rod 106 essentially has two longitudinal halves. It should be noted, however, that a conductor rod of the presently disclosure does not require multiple halves, illustrated in FIG. 3, below. Returning to FIG. 2, a first half, barrel 109, on the right side of FIG. 2, includes barrel shell 218 enclosing a series of tubular cylinder conductors aligned along the Y axis. Those cylinder conductors, viewed radially from axial center AB, are first cylinder conductor 202, second cylinder conductor 206, third cylinder conductor 210, and fourth cylinder conductor 214. Within that concentric arrangement, tubular regions of open space exist within first cylinder cavity 204 and third cylinder cavity 212. Further, barrel shell 218 encases barrel 109 and forms an open space 244 within retraction cavity 220 and barrel shell cavity 242. On the left side of FIG. 2, arm 110 includes arm shell 236 enclosing a series of tubular piston conductors also aligned along axial center AB of conductor rod 106. Those piston conductors, viewed radially from axial center AB, are first piston conductor 224, second piston conductor 228, and third piston conductor 232. Within that concentric arrangement, tubular regions of open space exist within first piston cavity 226 and second piston cavity 230. Further arm shell 236 encases arm 110 and forms an open space 246 within arm shell cavity 238.

In an operating state for conductor rod 106, arm 110 is inserted into barrel 109 to form a nested configuration of the piston conductors and the cylinder conductors. For example, when arm 110 is inserted into barrel 109, the outer surface 227 of first piston conductor 224 fits within an internal space formed by an inner surface 229 of first cylinder conductor 202. During operation, first piston conductor 224 maintains electrical contact with first cylinder conductor 202, permitting electrical conductivity between those tubular conductors. When first piston conductor 224 is mated within first cylinder conductor 202, first piston cavity 226 and first cylinder cavity 204 connectively extend axially through conductor rod 106 from head 122 to tip 124.

Similarly, when the combination of second piston conductor 228, third piston conductor 232, and interposed third piston insulation 234 are slid as part of arm 110 into barrel 109, an outer surface 231 of third piston conductor 232 fits within an inner surface 233 of third cylinder conductor 210, and an inner surface 235 of second piston conductor 228 fits over an outer surface 237 of second cylinder conductor 206. As a result, second piston conductor 228, third piston conductor 232, and third piston insulation 234 are disposed in the empty space defined by third cylinder cavity 212. In this configuration, third piston conductor 232 electrically contacts third cylinder conductor 210, and second piston conductor 228 electrically contacts second cylinder conductor 206. In some examples, and as shown similarly in FIG. 2, when conductor rod 106 is fully collapsed, at least some volume of empty space will remain within third cylinder cavity 212, which will have an annular or tubular shape and be defined radially by portions of second cylinder conductor 206 and third cylinder conductor 210.

Conversely, when arm 110 is inserted into barrel 109, the cylinder conductors will be disposed within cavities within the piston from left to right in FIG. 2, and the cylinder conductors are nested with the piston conductors. For example, the combination of first cylinder conductor 202, second cylinder conductor 206, and second cylinder insulation 208 are in the open space defined by second piston cavity 230 within arm 110, during which, as mentioned, first cylinder conductor 202 electrically contacts first piston conductor 224 and second cylinder conductor 206 electrically contacts second piston conductor 228. Likewise, in the illustrated example, the sandwich of third cylinder conductor 210, fourth cylinder conductor 214, and fourth cylinder insulation 216 are in the open space defined by arm shell cavity 238 within arm 110. Third cylinder conductor 210 will contact third piston conductor 232, and fourth cylinder conductor 214 will do the same against arm shell 236.

As mentioned above, head-end interface 120 provides at least an electrical connection between conductor rod 106 and work machine 100 for powering electric engine 102 and otherwise enabling operations within work machine 100. Head-end interface 120 also provides the physical securement of first cylinder conductor 202, second cylinder conductor 206, third cylinder conductor 210, and fourth cylinder conductor 214 to work machine 100, allowing arm 110 to extend and retract in relation to conductor rod 106, illustrated in more detail in FIGS. 3 and 4, below.

Figure 3:
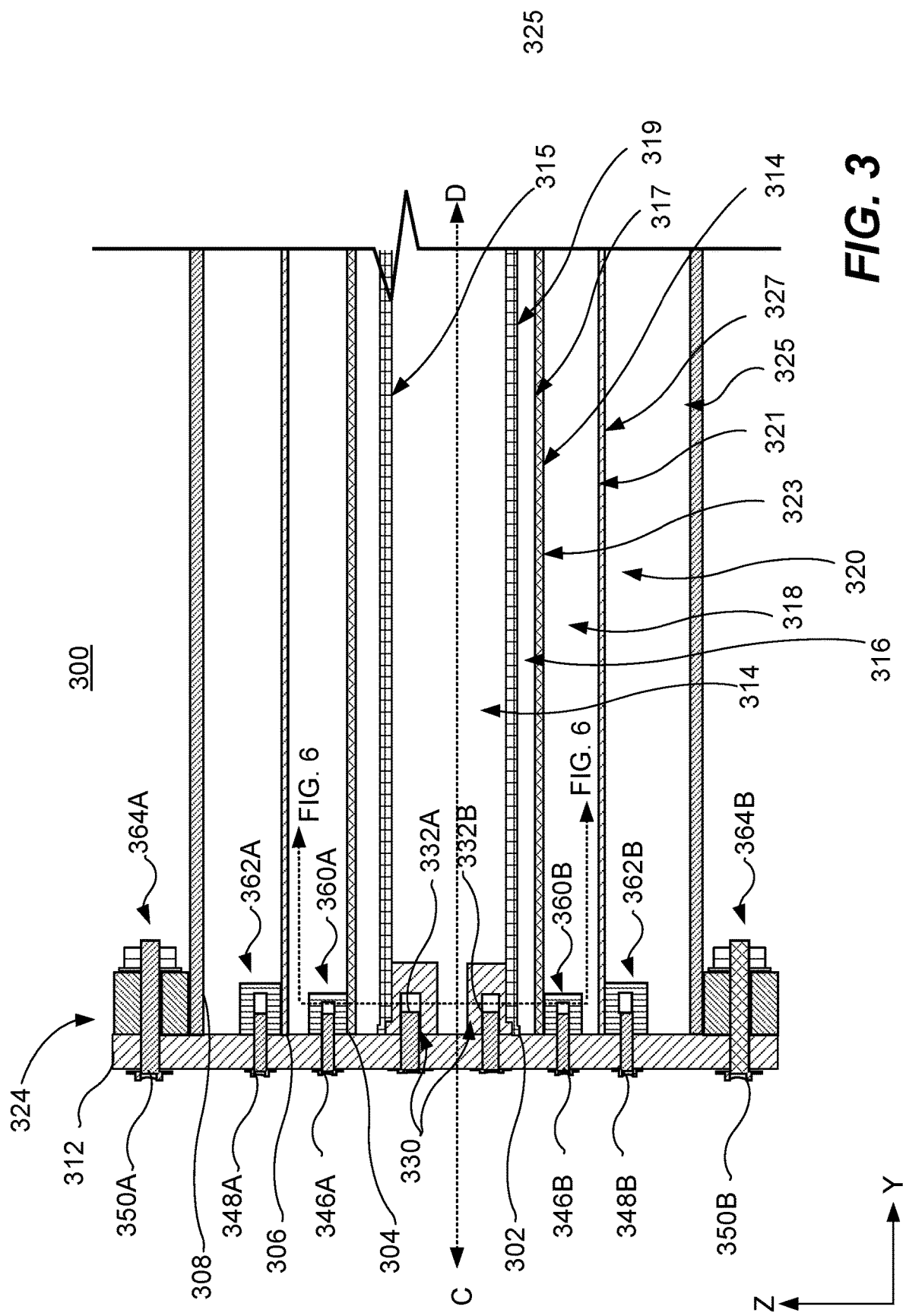
FIG. 3 is a longitudinal cross-sectional view of a conductor rod and a connector assembly, in accordance with one or more examples of the present disclosure.

FIG. 3 is a longitudinal cross-sectional view of a conductor rod 300 on the side of a tip 324 proximate to connector assembly 312, in accordance with one or more examples of the present disclosure. For purposes of simplicity, only the side of conductor rod 300 proximate to connector assembly 312 is illustrated, though the technologies and techniques described in FIG. 3 and below are applicable to conductor rod 300 proximate to a head-end interface, such as head-end interface 120 of FIGS. 1 and 2. FIG. 3 depicts a longitudinal cross-sectional of a portion of conductor rod 300 when viewed facing in the direction of travel for a work machine, such as work machine 100 of FIG. 1, i.e., in the direction of the X axis. Thus, conductor rod 300 lies in the Y-Z plane, as indicated in FIG. 3. Conductor rod 300 includes first cylinder conductor 302, second cylinder conductor 304, third cylinder conductor 306, and barrel 308. Conductor rod 300 includes connector assembly 312. Similar to the conductor rod 106 of FIG. 1, connector assembly 312 is located proximate to a power supply to conduct power from the power supply to work machine 100 (or load).

First cylinder conductor 302, second cylinder conductor 304, and third cylinder conductor 306 are concentric conductors of tubular shape, i.e. as hollow cylinders. In FIG. 3, from axial center CD outward, first cylinder conductor 302 is positioned at a center of barrel 308. Second cylinder conductor 304 concentrically surrounds first cylinder conductor 302. As with first cylinder conductor 302, second cylinder conductor 304 is a tubular conductor made of aluminum or a similar metal with high electrical conductivity and high mechanical strength. Second cylinder conductor 304 is similarly positioned concentrically around axial center CD. Moving farther out radially, third cylinder conductor 306 concentrically surrounds second cylinder conductor 304 and first cylinder conductor 302. Concentrically around third cylinder conductor 306 and the other tubular conductors, barrel 308 forms an outer conductive path. In some examples, barrel 308 can act as a fourth cylinder conductor if constructed from a conductive material. First cylinder conductor 302, second cylinder conductor 304, third cylinder conductor 306, and barrel 308 span a distance from head-end interface 310 to connector assembly 312. Radially beyond fourth cylinder conductor 214, barrel 308 encases conductor rod 300. Barrel 308 is typically a metal or similar substance providing structural integrity to conductor rod 300. However, in some examples, barrel 308 is a nonconductive material that isolations the electrically energized interior of conductor rod 300 from an environment. Barrel 308 has an inner diameter in excess of an outer diameter of fourth cylinder conductor 214.

As tubes, first cylinder conductor 302 defines first cylinder cavity 314 within inner surface 315 of first cylinder conductor 302, second cylinder conductor 304 defines second cylinder cavity 316 between inner surface 317 of second cylinder conductor 304 and outer surface 319 of first cylinder conductor 302, third cylinder conductor 306 defines third cylinder cavity 318 between inner surface 321 of third cylinder conductor 306 and outer surface 323 of the second cylinder conductor 304, and barrel 308 defines fourth cylinder cavity 320 between inner surface 325 of barrel 308 and outer surface 327 of the third cylinder conductor 306. First cylinder cavity 314, second cylinder cavity 316, third cylinder cavity 318, and/or fourth cylinder cavity 320 can be filled with insulative materials such as closed cell polyurethane foam. In other examples, first cylinder cavity 314, second cylinder cavity 316, third cylinder cavity 318, and/or fourth cylinder cavity 320 are filled with a dielectric. Dielectric materials can be solids, liquids, or gases. Some solids can be used as dielectrics, such as porcelain, glass, plastics, and the closed cell polyurethane foam described above. In configurations in which a cylinder conductor is hermetically sealed on both ends of cylinder conductor rod 300, fluidic dielectrics can be used in cavities, First cylinder cavity 314, second cylinder cavity 316, third cylinder cavity 318, and/or fourth cylinder cavity 320. Fluid dielectrics can include some forms of oil or gaseous dielectrics such as air, nitrogen, helium, and other dry gases such as sulfur hexafluoride. In further configurations in which a cylinder conductor or piston conductor is hermetically sealed on both ends of the cylinder conductor or piston conductor, a partial vacuum can be used. In various examples, a partial vacuum can be used as a nearly lossless dielectric even though its relative dielectric constant is unity. It should be noted that the dielectrics disclosed herein are merely examples, as other dielectrics may be used and are considered to be within the scope of the presently disclosed subject matter.

Different dielectrics can be used in various cylinder cavities of conductor rod 300 to allow for different voltages and different types of potentials to be conducted by conductor rod 300. For example, first cylinder conductor 302 and second cylinder conductor 304 can be configured to conduct a DC voltage and third cylinder conductor 306 can be configured to conduct an AC voltage. Because both first cylinder conductor 302 and second cylinder conductor 304 are conducting DC voltage, there may be no need or requirement to have a dielectric other than air between first cylinder conductor 302 and second cylinder conductor 304. However, if the AC voltage being carried on third cylinder conductor 306 is of a certain voltage level or frequency, a dielectric of suitable strength can be used to prevent a short between second cylinder conductor 304 and third cylinder conductor 306.

The various annular or tubular cavities within barrel 308, namely, first cylinder cavity 314, second cylinder cavity 316, third cylinder cavity 318, and/or fourth cylinder cavity 320, are sealed or capped by the attachment of the ends of the cylinder conductors to an interface. In FIG. 3, the interface is connector assembly 312, though the same technology and techniques can be used to attach the other ends of cylinder conductors to another interfaces, such as head-end interface 120 of FIG. 2. The attachment is designed to provide an airtight (or hermetic) seal within these cavities. For example, when using fluidic insulative materials or dielectrics, or a partial vacuum, a hermetic seal maintains the fluid within the particular cavity to which the fluid is inserted, or, maintains the partial vacuum from which the air was pumped out. To provide for an airtight seal, the ends of the cylinder conductors can be affixed to interfaces using various technologies, including welding, glue, adhesive, gaskets, and the like. To removably affix the ends of the cylinder conductors, whereby the ends can be installed, removed, and reinstalled, the cylinder conductors can use a terminal connector assembly. The terminal connector assemblies use a threaded member inserted into a terminal receiver. The terminal receiver is affixed to a respective cylinder conductor, thereby providing for affixing and removing the cylinder conductors from either a head-end interface, such as head-end interface of FIGS. 1 and 2, or connector assembly 312.

Conductor rod 300 of FIG. 3 is illustrated as using different types of terminal connector assemblies. In FIG. 3, first cylinder conductor 302 is affixed to connector assembly 312 using terminal connector assembly 330 and threaded members 332A and 332B. Threaded members 332A and 332B are inserted through connecter assembly 312 and into terminal connector assembly 330. At head-end interface 310, first cylinder conductor 302 is affixed to head-end interface 310 using terminal connector assembly 334 and threaded members 336A and 336B. Threaded members 336A and 336B are inserted through head-end interface 310 and into terminal connector assembly 334. Terminal connector assemblies 330 and 334 are affixed to first cylinder conductor 302 using various technologies such as, but not limited to, welding, soldering, and the like. Terminal connector assemblies 330 and 334 are ring-type connector assemblies. Ring-type terminal connector assemblies use a cylindrical ring to which a cylinder conductor is affixed, shown in more detail in FIG. 4.

Figure 4:
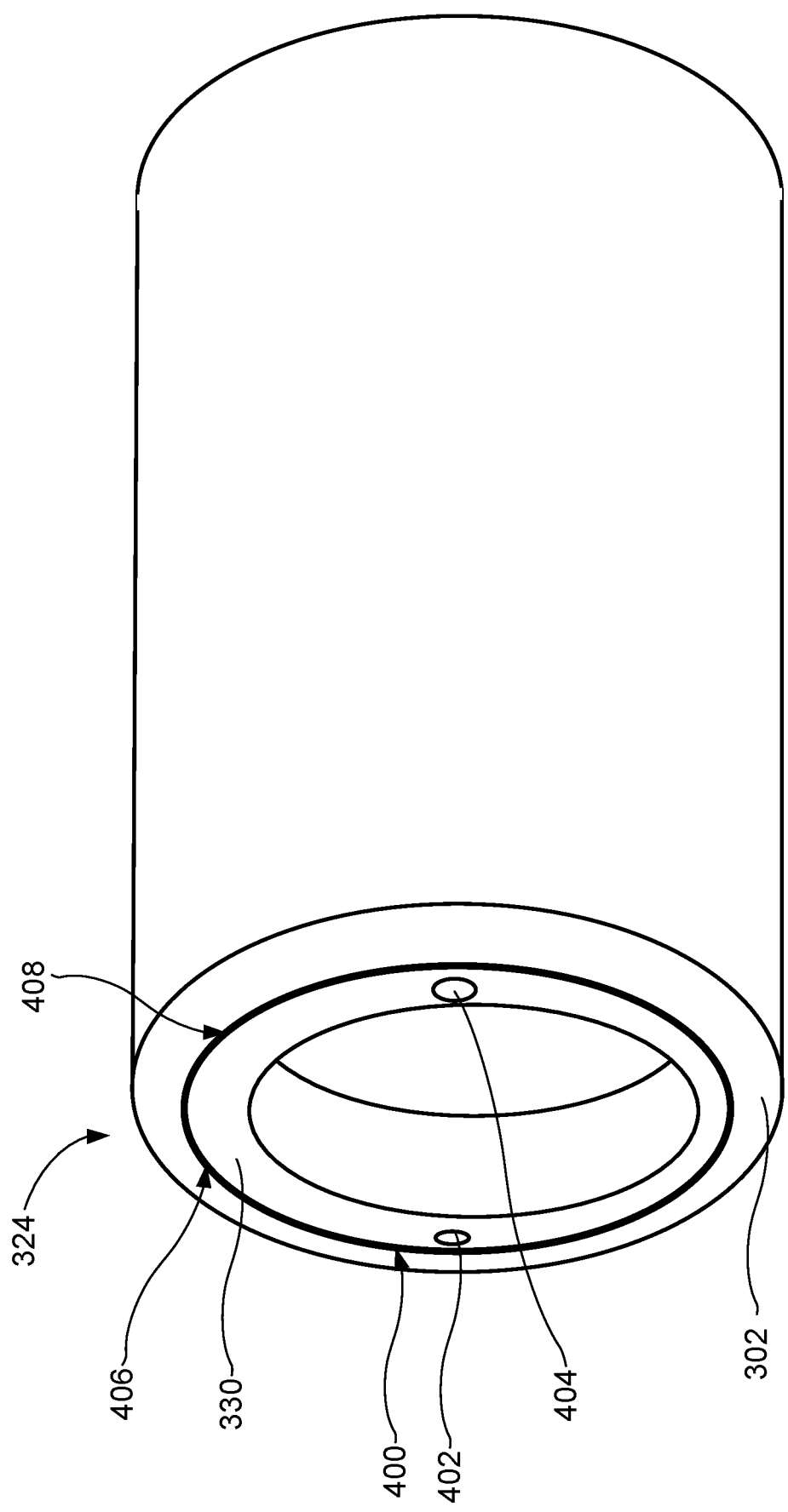
FIG. 4 is an isometric view of a cylinder conductor having a ring-type terminal connector assembly, in accordance with one or more examples of the present disclosure.

FIG. 4 is an isometric view of first cylinder conductor 302 illustrating a ring-type terminal connector assembly, in accordance with one or more examples of the present disclosure. First cylinder conductor 302 has disposed within an inner diameter of first cylinder conductor 302 a terminal connector assembly 330. Terminal connector assembly 330 is a tubular shape that has an outer diameter, when measured radially from the center of first cylinder conductor 302, that allows an inner surface of first cylinder conductor 302 to abut and be affixed to terminal connector assembly 330 at interface 400. Terminal connector assembly 330 includes receiving locations 402 and 404. Receiving locations 402 and 404 are locations in terminal connector assembly 330 into which threaded members 332A and 332B are inserted and threaded to secure first cylinder conductor 302 and terminal connector assembly 330 to connector assembly 312. It should be noted that because terminal connector assembly 330 is tubular in shape, first cylinder conductor 302 may be removably affixed against connector assembly 312 without mechanical attachment to terminal connector assembly 330. For example, terminal connector assembly 330 may be removably affixed to connector assembly 312 and then first cylinder conductor 302 is inserted onto and around terminal connector assembly 330, whereby an inner surface 406 of first cylinder conductor 302 is inserted over an outer surface 408 of terminal connector assembly 330 at interface 400. While this may not mechanically affix first cylinder conductor 302 to connector assembly 312 in the same manner as if first cylinder conductor 302 was welded to terminal connector assembly 330, when first cylinder conductor 302 is placed over terminal connector assembly 330, terminal connector assembly 330 positionally secures first cylinder conductor 302. First cylinder conductor 302 may be affixed to a particular location on connector assembly 312 using not only the secured position of terminal connector assembly 330 on connector assembly 312, but also by the use of shaped surfaces, illustrated in more detail in FIG. 5, below.

Second cylinder conductor 304, third cylinder conductor 306, and barrel 308 are affixed to connector assembly 312 using cuboid connectors. More specifically, second cylinder conductor 304 is affixed to connector assembly 312 using cuboid connectors 360A and 360B. Third cylinder conductor 306 is affixed to connector assembly 312 using cuboid connectors 362A and 362B. Barrel 308 is affixed to connector assembly 312 using cuboid connectors 364A and 364B. As with terminal connector assembly 330, the cuboid connectors use threaded members to affix their respective cuboid connectors to connector assembly 312, and thus, affixing their respective cylinder conductor to connector assembly 312. In FIG. 3, threaded members 346A and 346B affix cuboid connectors 360A and 360B, respectively, to connector assembly 312. Threaded members 348A and 348B securely affix cuboid connectors 362A and 362B, respectively, to connector assembly 312. Threaded members 350A and 350B securely affix cuboid connectors 364A and 364B, respectively, to connector assembly 312. The cylinder conductors can be permanently affixed to their respective cuboid connectors using welding, soldering, or other similar technology. In other examples, the cylinder conductors can be placed against their respective cuboid connectors whereby the cuboid connector provides a physical barrier to movement of the cylinder conductor. In either technology, the cuboid connector is sized and shaped to abut to an outer surface of their respective cylinder conductor, illustrated in more detail in FIG. 6.

Figure 5:
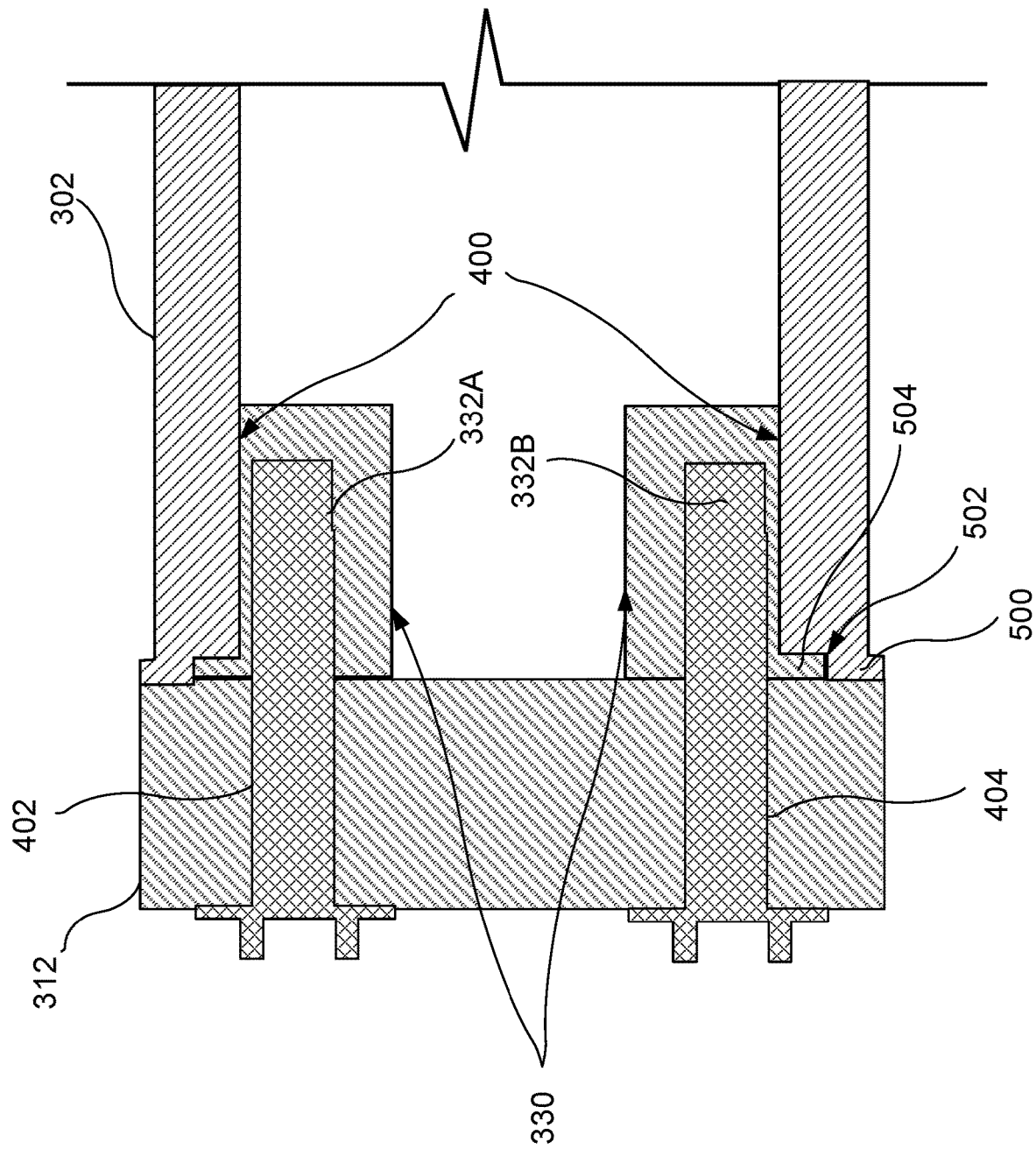
FIG. 5 is a cross-sectional view showing a portion of a cylinder conductor affixed to connector assembly, in accordance with one or more examples of the present disclosure.

FIG. 5 is a cross-sectional view showing the portion of first cylinder conductor 302 affixed to connector assembly 312, in accordance with one or more examples of the present disclosure. As illustrated in FIG. 5, first cylinder conductor 302 is affixed to connector assembly 312 by terminal connector assembly 330. In FIG. 5, first cylinder conductor 302 is engaged onto terminal connector assembly 330 at interface 400. As noted above, first cylinder conductor 302 can be engaged onto terminal connector assembly 330 at interface 400 by affixing first cylinder conductor 302 to terminal connector assembly 330 using welding, soldering, or other similar technique. In another example, first cylinder conductor 302 can be engaged onto terminal connector assembly 330 at interface 400 by slidable engaging first cylinder conductor 302 onto terminal connector assembly 330 at interface 400. The presently disclosed subject matter is not limited to any particular technology for affixing, either permanently or temporarily, first cylinder conductor 302 onto terminal connector assembly 330. Also illustrated in FIG. 5 are threaded members 332A and 332B. Threaded members 332A and 332B are inserted through connector assembly 312 thru receiving locations 402 and 404, respectively, and into terminal connector assembly 330.

As noted above with respect to FIG. 4, first cylinder conductor 302 and terminal connector assembly 330 may be shaped or formed to provide additional securement capabilities. This means that and end of first cylinder conductor 302 and terminal connector assembly 330 may not be perfectly cylindrical, but rather, may be shaped in a manner to provide additional mechanical benefits. As shown in FIG. 5, first cylinder conductor 302 includes flange 500 and receiving slot 502. Terminal connector assembly 330 includes flange 504. In some examples, the flange 504 is sized and shaped to fit securely within receiving slot 502. Flange 500 can be sized and shaped to provide an increased surface area onto which first cylinder conductor 302 is secured to the surface of connector assembly 312. In a similar manner, flange 504 can be sized and shaped to provide an increased surface area onto which terminal connector assembly 330 is secured to the surface of connector assembly 312. The additional surface area provided by flange 500 and flange 504 can provide for hermetically sealing first cylinder conductor 302 to connector assembly 312. FIGS. 4 and 5 illustrate an example configuration for securing a cylinder conductor to connector assembly 312 or head-end interface 310. While terminal connector assembly 330 is described as a ring structure over which and onto first cylinder conductor 302 is inserted, other types of terminal connector assemblies may be used, such as cuboid connectors described in more detail in FIG. 6.

Figure 6:
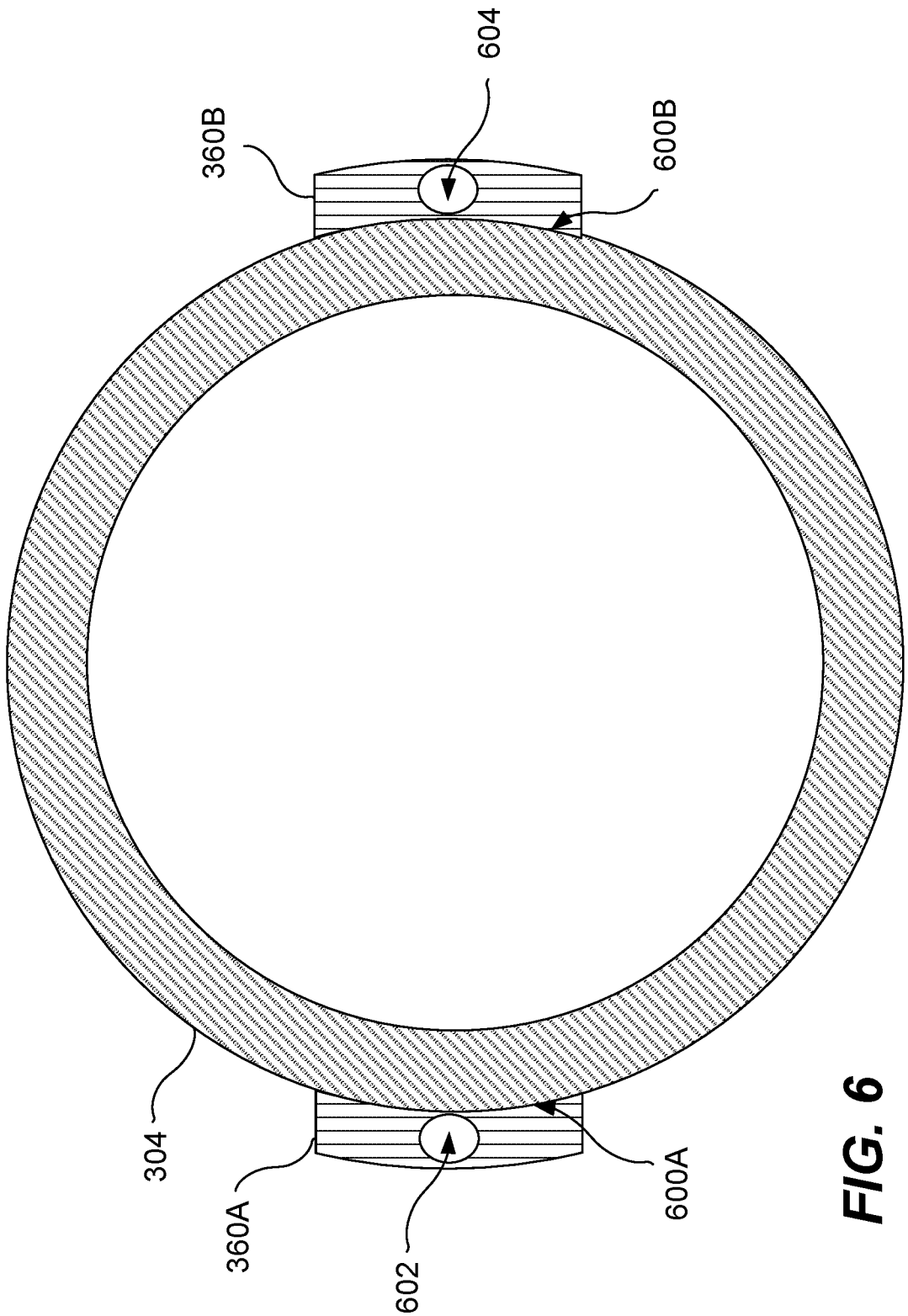
FIG. 6 is a cross-sectional view of a second cylinder conductor and cuboid connectors, in accordance with one or more examples of the present disclosure.

FIG. 6 is a cross-sectional view of second cylinder conductor 304 and cuboid connectors 360A and 360B along the cut lines illustrated in FIG. 3 but with first cylinder conductor 302 and connector assembly 330 removed for purposes of simplicity, in accordance with one or more examples of the present disclosure. As shown in FIG. 6, cuboid connectors 360A and 360B abut to an outer surface of second cylinder conductor 304 at interfaces 600A and 600B. As noted above, second cylinder conductor 304 can be engaged with cuboid connectors 360A and 360B at interfaces 600A and 600B by affixing second cylinder conductor 304 to cuboid connectors 360A and 360B at interfaces 600A and 600B, respectively, using welding, soldering, or other similar techniques. In another example, second cylinder conductor 304 can be engaged into cuboid connectors 360A and 360B at interfaces 600A and 600B by slidably engaging second cylinder conductor 304 into the inner surfaces of cuboid connectors 360A and 360B at interfaces 600A and 600B. The presently disclosed subject matter is not limited to any particular technology for affixing, either permanently or temporarily, second cylinder conductor 304 onto cuboid connectors 360A and 360B. Also illustrated in FIG. 6 are receiving locations 602 and 604, into which threaded members 346A and 346B are inserted.

Threaded members, such as threaded members 346A and 346B, are used to secure cuboid connectors, such as cuboid connectors 360A and 360B of FIG. 6, or ring-like connector assemblies, such as terminal connector assembly 330 of FIG. 4, to a head-end interface or connector assembly. However, these threaded members may also be used to electrically connect a load to one or more power sources, such as a power rail system, illustrated in more detail in FIGS. 7 and 8, below.

Figure 7:
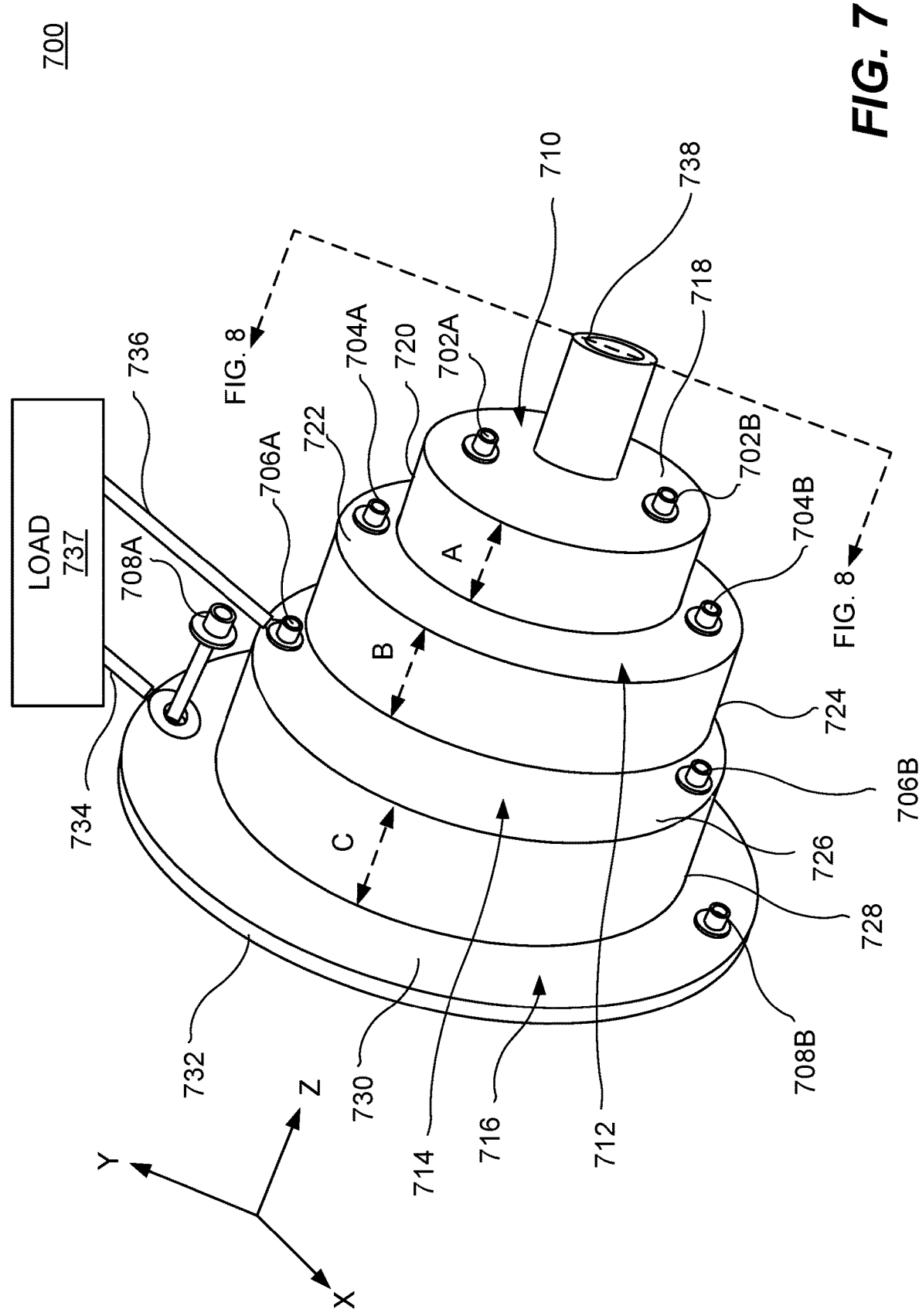
FIGS. 7 and 8 depict an example of a head-end interface with multiple tiered levels that may be used to electrically and physically connect a conductor rod to a load or work machine, in accordance with one or more examples of the present disclosure.
Figure 8:
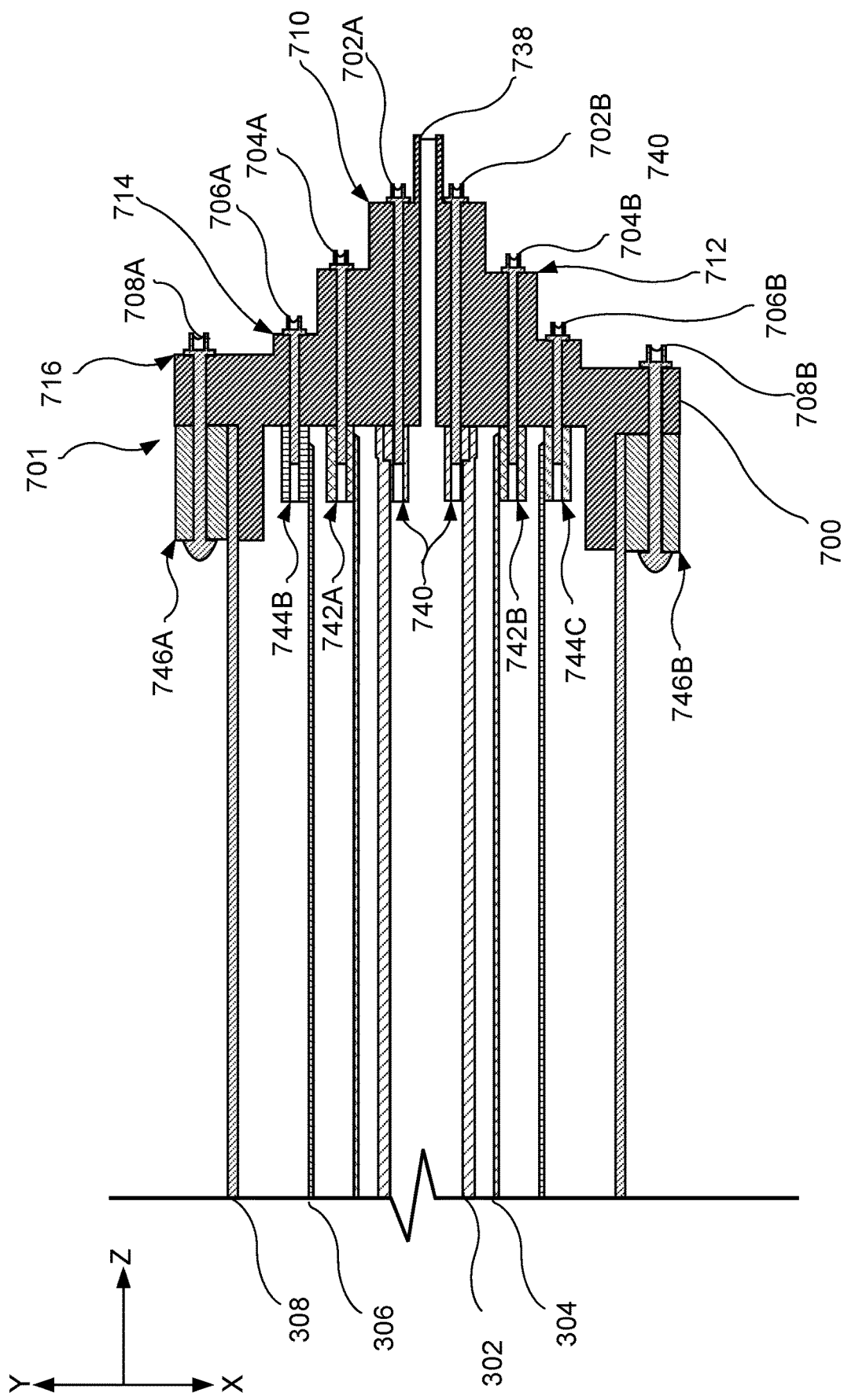

FIGS. 7 and 8 depict an example of a head-end interface 700 with multiple tiered levels that may be used to electrically and physically connect a conductor rod, such as conductor rod 300 of FIG. 3, to a load or work machine, in accordance with one or more examples of the present disclosure. For example, head-end interface 700 can be used as head-end interface 120 of FIG. 1. Head-end interface 700 includes structural features that enable electrical connection with conductor rod 300 using threaded members. Head-end interface 700, with an interface on the circumference of conductor rod 300, provides access for passing electrical power from conductor rod 300 to a work machine, such as work machine 100. FIG. 7 provides an isometric view of head-end interface 700 within an XYZ coordinate system. FIG. 8 provides a longitudinal cross-sectional view of head-end interface 700 along the cut lines shown in FIG. 7, revealing internal conductors, as discussed below. Head-end interface 700 is shown illustrated with threaded members 702A and 702B, 704A and 704B, 706A and 706B, and 708A and 708B. Threaded members 702A and 702B, 704A and 704B, 706A and 706B, and 708A and 708B are constructed in a manner similar to threaded members of FIG. 3. Threaded member 708A is shown in FIG. 7 as being partially extracted from head-end interface 700.

Head-end interface 700 includes tiers 710-716 that are disposed above each other longitudinally along the Z axis and are generally circular in shape. Tier 710 has a height A above tier 712. Tier 712 has a height B above tier 714. Tier 714 has a height C above tier 716. Tier 710 is defined by planer section 718, which is generally circular in shape, and riser section 720. Tier 712 is defined by planer section 722, which is generally circular in shape, and riser section 724. Tier 714 is defined by planer section 726, which is generally circular in shape, and riser section 728. Tier 716, which may be called the base of head-end interface 700, is defined by planer section 730 and riser section 732. Threaded members 702A and 702B are located on tier 710. Threaded members 704A and 704B are located on tier 712. Threaded members 706A and 706B are located on tier 714. Threaded members 708A and 708B are located on tier 716. Head-end interface 700 is shown with port 738. Port 738 is an opening in head-end interface 700 and provides an opening through head-end interface 700 into which fluids may be introduced or air may be removed to create a partial vacuum, described in more detail in FIG. 8, below.

FIG. 8 is a longitudinal cross-sectional view of head-end interface 700 along the cut lines shown in FIG. 7. Head-end interface 700 is physically and electrically connected to conductor rod 300 of FIG. 3 at head 701 of conductor rod 300 longitudinally opposite to tip 324 and connector assembly 312, thus completing the electrical and physical connections between a power supply supplying power to connector assembly 312 for loads connected to head-end interface 700. In some examples, head 701 can be a first end of conductor rod 300 and tip 324 is a second end of conductor 300. Thus, various components may be described in context of being proximate to head 701 or tip 324. Threaded members 702A and 702B are located on tier 710. Threaded members 704A and 704B are located on tier 712. Threaded members 706A and 706B are located on tier 714. Threaded members 708A and 708B are located on tier 716. First cylinder conductor 302 is affixed to head-end interface 700 using threaded members 702A and 702B affixed to terminal connector assembly 740 proximate to head 701. Second cylinder conductor 304 is affixed to head-end interface 700 using threaded members 704A and 704B affixed to terminal connector assemblies 742A and 742B, respectively, proximate to head 701. Third cylinder conductor 306 is affixed to head-end interface 700 using threaded members 706A and 706B affixed to terminal connector assemblies 744A and 744B, respectively, proximate to head 701. Barrel 308 is affixed to head-end interface 700 using threaded members 708A and 708B affixed to terminal connector assemblies 746A and 746B, respectively, proximate to head 701.

To assemble conductor rod 300, referring to FIGS. 3 and 8, head-end interface 700 and connector assembly 312 are provided. It should be noted that the order of assembly can commence either from head-end interface 700 or connector assembly 312, or may alternate from cylinder conductor to cylinder conductor. The following is merely an example. Continuing with the assembly, first cylinder conductor 302 is affixed to head-end interface 700 by threading threaded members 702A and 702B into terminal connector assembly 740, proximate to head 701. Second cylinder conductor 304 is affixed to head-end interface 700 by threading threaded members 704A and 704B into terminal connector assemblies 742A and 742B, respectively, proximate to head 701. Third cylinder conductor 306 is affixed to head-end interface 700 by threading threaded members 706A and 706B into terminal connector assemblies 744A and 744B, respectively, proximate to head 701. Barrel 308 is affixed to head-end interface 700 by threading threaded members 708A and 708B into terminal connector assemblies 746A and 746B, respectively, proximate to head 701. To complete the assembly of conductor rod 300, first cylinder conductor 302 is affixed to connector assembly 312 by threading threaded members 332A and 332A into terminal connector assembly 330, proximate to tip 324. Second cylinder conductor 304 is affixed to connector assembly 312 by threading threaded members 346A and 346B into terminal connector assemblies 340A and 340B, respectively, proximate to tip 324. Third cylinder conductor 306 is affixed to connector assembly 312 by threading threaded members 348A and 348B into terminal connector assemblies 342A and 342B, respectively, proximate to tip 324. Barrel 308 is affixed to connector assembly 312 by threading threaded members 350A and 350B into terminal connector assemblies 344A and 344B, respectively, proximate to tip 324.

INDUSTRIAL APPLICABILITY

The present disclosure provides a conductor rod (or barrel) that has internal concentric conductors that conduct electrical power from a source to a receiving system or load, such as the work machine 100. The concentric conductor includes one or more conducting tubes interior to an outer tube, extending concentrically around a central axis. The conducting tubes are affixed to a head-end interface or conductor assembly at either end of the concentric conductor to electrically and physically isolate the conducting tubes from the environment. The terminal connector, through the use of hollow tubes with a degree of structural rigidity, can be used in situations requiring the concentric conductor to span an unsupported length. For example, the concentric conductor can be used to electrically connect a moving machine to an electrical power supply a lateral distance from the moving machine. The rigidity of the concentric conductor can reduce or eliminate the need for addition supports for the concentric conductor over the unsupported length. Further, the rigidity of the concentric conductor can reduce or eliminate deformation (bending) of the concentric conductor over the unsupported length, thus providing for a constant or near constant shape of the conductor, reducing the need to make adjustments of the distance between the source and the load solely caused by the deformation. Further, using hollow tubes as concentric conductors can provide for the use of different fluids, solids, or vacuum to be used as a dielectric, even different among the conducting tubes themselves as, in some examples, the interior of the conducting tubes are isolated from each other.

Further, the use of a multi-tiered head-end cap can provide additional benefits. Having tiers 710-716 provide for the ability to connect electrical connectors onto head-end interface 700 while maximizing the distance between adjacent threaded members. For example, threaded member 708A and 706A are proximate to each other radially along the X axis. If on the same plane, threaded member 708A may be in a proximate distance that may make connecting electrical connector 734 onto threaded member 708A difficult because of the close contact between threaded member 708A and threaded member 706A. Further, if threaded member 708A and 706A are proximate to each other radially along the X axis, the close proximate distance may increase a probability of a short between threaded member 708A and 706A. For example, if on the same tier (or plane), electrical connector 734 may be in close proximity to electrical connector 736 affixed to threaded member 706A. Because threaded members 708A and 706A may each be carrying electrical current from a power source, the close proximity may increase the probably of an electrical short, potentially causing safety issues and equipment damage. Electrical connectors 734 and 736 provide electrical power received from threaded members 708A and 706A, respectively, to load 737.

However, as illustrated, the use of tiers 710-716 provides a degree of separation from proximate threaded members along the Z axis. Although threaded members 708A and 706A may be in close proximity along the X axis, threaded member 708A is separated from threaded member 706A along the Z axis by height C, providing for an increased amount of space between threaded member 708A and 706A, making maintenance and other operations potentially easier.

Further, because of the distance between threaded member 708A and threaded member 706A, the probability of an electrical short between threaded members 708A and 706A may be reduced.

Unless explicitly excluded, the use of the singular to describe a component, structure, or operation does not exclude the use of plural such components, structures, or operations or their equivalents. As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A conductor rod, comprising:
   a first cylinder conductor extending along a longitudinal axis of the conductor rod, the first cylinder conductor having:
     a first inner diameter,
     a first outer diameter,
     a first terminal connector assembly affixed to the first cylinder conductor proximate a first end of the conductor rod, and
     a second terminal connector assembly affixed to the first cylinder conductor proximate a second end of the conductor rod;
   a barrel extending along the longitudinal axis of the conductor rod, the barrel having:
     a second inner diameter greater than the first outer diameter,
     a third terminal connector assembly affixed to the barrel proximate the first end of the conductor rod, and
     a fourth terminal connector assembly affixed to the barrel proximate the second end of the conductor rod;
   a head-end interface, the first terminal connector assembly being affixed to the head-end interface affixing the first cylinder conductor to the head-end interface, and, the third terminal connector assembly being affixed to the head-end interface affixing the barrel to the head-end interface; and
   a connector assembly, the second terminal connector assembly being affixed to the connector assembly affixing the first cylinder conductor to the connector assembly, and, the fourth terminal connector assembly being affixed to the connector assembly affixing the barrel to the connector assembly.

2. The conductor rod of claim 1, wherein the first cylinder conductor or the barrel comprises graphite, copper, aluminum, gold, silver, nickel, zinc, or alloys thereof.

3. The conductor rod of claim 1, wherein the first terminal connector assembly is affixed to the head-end interface by a first threaded member inserted through the head-end interface and into the first terminal connector assembly.

4. The conductor rod of claim 1, wherein the second terminal connector assembly is affixed to the connector assembly by a second threaded member inserted through the connector assembly and into the second terminal connector assembly.

5. The conductor rod of claim 1, wherein an inner surface of the first cylinder conductor surrounds an outer surface of the first terminal connector assembly at the head-end interface and the inner surface of the first cylinder conductor surround an outer surface of the second terminal connector assembly at the connector assembly.

6. The conductor rod of claim 1, further comprising a second cylinder conductor extending along the longitudinal axis of the conductor rod, the second cylinder conductor having a third inner diameter greater than the first outer diameter of the first cylinder conductor and a fourth outer diameter less than the second inner diameter of the barrel, the second cylinder conductor further comprising a fifth terminal connector assembly affixed to the second cylinder conductor proximate to the first end of the conductor rod and a sixth terminal connector assembly affixed to the first cylinder conductor proximate to the second end of the conductor rod.

7. The conductor rod of claim 6, wherein the first cylinder conductor is configured to conduct a first voltage potential and the second cylinder conductor is configured to conductor a second voltage potential.

8. The conductor rod of claim 6, further comprising:
a first cavity defined by a first outer surface of the first cylinder conductor and a first inner surface of the second cylinder conductor, wherein the first cavity is at least partially filled with a first dielectric; and
a second cavity defined by a second outer surface of the second cylinder conductor and a second inner surface of the barrel, wherein the second cavity is at least partially filled with a second dielectric.

9. The conductor rod of claim 8, wherein the first dielectric or the second dielectric comprises a fluid.

10. The conductor rod of claim 9, wherein the fluid comprises air, nitrogen, or sulfur hexafluoride.

11. The conductor rod of claim 9, wherein the first dielectric or the second dielectric comprises a partial vacuum.

12. A work machine, comprising:
an electric engine;
a conductor rod for providing electrical energy to the electric engine from a power source, the conductor rod extending along a longitudinal axis of the conductor rod, from a head-end interface proximate to the work machine to a connector assembly spaced laterally from the work machine, the conductor rod comprising:
a first cylinder conductor extending along the longitudinal axis of the conductor rod having a first inner diameter and a first outer diameter, the first cylinder conductor comprising a first terminal connector assembly affixed to the head-end interface and a second terminal connector assembly affixed to the connector assembly;
a second cylinder conductor extending along the longitudinal axis of the conductor rod having a second inner diameter greater than the first outer diameter of the first cylinder conductor and a second outer diameter, the second cylinder conductor comprising a third terminal connector assembly affixed to the head-end interface and a fourth terminal connector assembly affixed to the connector assembly;
a barrel extending along the longitudinal axis of the conductor rod having a third inner diameter greater than the second outer diameter of the second cylinder conductor and a third outer diameter, the barrel comprising a fifth terminal connector assembly affixed to the head-end interface and a sixth terminal connector assembly affixed to the connector assembly; and
wherein the first cylinder conductor or the second cylinder conductor comprise an electrically conductive material to conduct electrical power from a power source to the electric engine of the work machine.

13. The work machine of claim 12, wherein the electrically conductive material comprises copper, aluminum, gold, silver, nickel, zinc, or alloys thereof.

14. The work machine of claim 12, wherein the electrically conductive material comprises graphite.

15. The work machine of claim 12, wherein the first cylinder conductor is configured to conduct a first potential of electrical power and the second cylinder conductor is configured to conduct a second potential of electrical power.

16. The work machine of claim 12, wherein the first cylinder conductor is configured to conduct direct current and the second cylinder conductor is configured to conduct alternating current.

17. The work machine of claim 12, wherein the conductor rod comprises:
a first cavity defined by a first outer surface of the first cylinder conductor and a first inner surface of the second cylinder conductor, wherein the first cavity is at least partially filled with air, nitrogen, or sulfur hexafluoride or a partial vacuum is pulled within the first cavity; and
a second cavity defined by a second outer surface of the second cylinder conductor and a second inner surface of the barrel, wherein the second cavity is at least partially filled with air, nitrogen, or sulfur hexafluoride or a partial vacuum is pulled within the second cavity.

18. A method of assembling a conductor rod for use on a work machine, the method comprising:
affixing a first cylinder conductor to a head-end interface by threading a first set of threaded members through the head-end interface into a first terminal connector assembly affixed to the first cylinder conductor, the first cylinder conductor having a first outer diameter;
affixing a second cylinder conductor to the head-end interface by threading a second set of threaded members through the head-end interface into a second set of terminal connector assemblies affixed to the second cylinder conductor, wherein the second cylinder conductor has a second inner diameter and a second outer diameter, wherein the second inner diameter is greater than the first outer diameter of the first cylinder conductor defining a first cavity;
affixing a barrel to the head-end interface by threading a third set of threaded members through the head-end interface into a third set of terminal connector assemblies affixed to the barrel, wherein the barrel has a third inner diameter and third outer diameter, wherein the third inner diameter is greater than the second outer diameter of the second cylinder conductor defining a second cavity;
affixing the first cylinder conductor to connector assembly by threading a fourth set of threaded members through the connector assembly into a fourth terminal connector assembly affixed to the first cylinder conductor;
affixing the second cylinder conductor to the connector assembly by threading a fifth set of threaded members through the connector assembly into a fifth set of terminal connector assemblies affixed to the second cylinder conductor; and affixing the barrel to the connector assembly by threading a sixth set of threaded members through the connector assembly into a sixth set of terminal connector assemblies affixed to the barrel.

19. The method of claim 18, wherein a dielectric is introduced into the first cavity or the second cavity prior to affixing the first cylinder conductor, the second cylinder conductor, and the barrel to the connector assembly.

20. The method of claim 19, further comprising affixing the conductor rod to the work machine.

\* \* \* \* \*